(12) United States Patent
Igawa

(10) Patent No.: US 6,382,662 B1
(45) Date of Patent: May 7, 2002

(54) AIR BAG AND AIR BAG DEVICE

(75) Inventor: Tadahiro Igawa, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/597,086

(22) Filed: Jun. 20, 2000

(30) Foreign Application Priority Data

Jul. 15, 1999 (JP) ............................................ 11-201876
May 11, 2000 (JP) ....................................... 2000-138914

(51) Int. Cl.⁷ .............................................. B60R 21/24
(52) U.S. Cl. ....................................................... 280/729
(58) Field of Search ................................ 280/729, 731, 280/739, 740, 741, 742, 743.1

(56) References Cited

U.S. PATENT DOCUMENTS

| 5,172,933 | A | * | 12/1992 | Strasser ........................ 280/740 |
| 5,249,824 | A | * | 10/1993 | Swann et al. ................ 280/729 |
| 5,573,270 | A | | 11/1996 | Sogi et al. |
| 5,678,858 | A | * | 10/1997 | Nakayama et al. ....... 280/743.2 |
| 6,022,046 | A | | 2/2000 | Isomura et al. |
| 6,209,911 | B1 | * | 4/2001 | Igawa et al. ................. 280/740 |

FOREIGN PATENT DOCUMENTS

JP 10-157546 6/1998

* cited by examiner

Primary Examiner—Paul N. Dickson
Assistant Examiner—Faye M. Fleming
(74) Attorney, Agent, or Firm—Kanesaka & Takeuchi

(57) ABSTRACT

An air bag is formed of an outer bag and an inner bag situated inside the outer bag. The inner bag has upper and lower flow-out ports positioned on a driver's side relative to a plane of a steering wheel when the inner bag is expanded. Since an opening area of the lower flow-out port is larger than that of the upper flow-out port, a large quantity of gas in the inner bag is discharged in the lower direction through the flow-out port. As a result, the outer bag quickly expanded in the lower direction rather than in the upper direction, and quickly enters a narrow space between a driver and the steering wheel.

14 Claims, 19 Drawing Sheets

AIR BAG AND AIR BAG DEVICE

BACKGROUND OF THE INVENTION AND RELATED ART STATEMENT

The invention relates to an air bag, and an air bag device, for protecting a driver at a time of a car collision. More specifically, the present invention relates to an air bag expanding to a space between the driver and a lower portion of a steering wheel, and an air bag device including the air bag.

An air bag device provided at a fixing portion in front of a seat in a vehicle is to protect a passenger or driver by quickly expanding an air bag with a pressure of a gas discharged from a gas generator called "inflator" at an emergency situation, such as car collision.

In an air bag device for a driver, there may be provided a cloth for guiding a gas into the air bag for quickly expanding the air bag in an upper direction rather than a lateral direction when the inflator is actuated.

Incidentally, an "upper direction of an air bag device" in the present specification is defined as an upper side or direction of the air bag in a posture of a steering system of the vehicle running straight where the air bag device is provided at a center of a steering wheel. Namely, the upper direction is a direction from the center of the air bag toward the front glass along the longitudinal direction of the vehicle. The same definition is applied to a lower, left and right directions.

Japanese Patent Publication (KOKAI) No. 10-226294 discloses an air bag wherein an inner bag is housed in an outer bag, and a gas is discharged in the upper and lower directions from gas flow-out ports provided at both upper and lower sides of the inner bag.

Japanese Patent Publication (KOKAI) No. 9-30353 discloses an air bag wherein two panel-shape straps are provided in parallel in the air bag and an inflator is disposed therebetween, so that a gas from the inflator is guided to the upper and lower directions in the bag by the straps.

In the air bag of Japanese Patent Publication No. 10-226294, a positional relationship between the gas flow-out ports of the inner bag and a steering wheel is not considered. In case the gas flow-out ports are retreated on a steering column side relative to the steering wheel, the gas flowing out from the gas flow-out ports is changed toward the driver by the steering wheel in its flowing direction. Therefore, the expanding speed in the upper and lower directions of the air bag does not become sufficiently large.

In the air bag of Japanese Patent Publication No. 9-30353, since the straps are employed instead of an inner bag, the gas from the inflator hits a front surface of the air bag, and is then branched to the upper direction and the lower direction of the air bag. Thus, the air bag does not sufficiently quickly expand in the upper and lower directions.

In view of the above defects, the present invention has been made and an object of the invention is to provide an air bag and air bag device, wherein the air bag is sufficiently quickly expanded especially in the lower direction.

Further objects and advantages of the invention will be apparent from the following description of the invention.

SUMMARY OF THE INVENTION

In order to attain the above objects, an air bag according to a first aspect of the present invention includes an outer bag, an inner bag housed in the outer bag, an upper side flow-out port for allowing a gas to flow in an upper direction from the inner bag and a lower side flow-out port for allowing the gas to flow in a lower direction from the inner bag, wherein the upper side flow-out port and the lower side flow-out port are disposed on a driver's side relative to a steering wheel plane in an expanded state of the inner bag.

According to a second aspect of the invention, an opening area of the lower side flow-out port may be made larger than that of the upper side flow-out port.

According to a third aspect of the invention, the lower side flow-out port may be disposed closer to an inner circumference of the outer bag than the upper side flow-out opening.

According to a fourth aspect of the invention, an air bag includes an outer bag and an inner bag having a gas flow-out port and housed in the outer bag, wherein the gas flow-out port of the inner bag allows gas to flow out only in a lower direction, and the gas flow-out port is disposed on a driver's side relative to a steering wheel plane in an expanded state of the inner bag.

An air bag device according to the present invention includes the air bag, and a steering device according to the present invention includes the air bag device.

In the air bag, air bag device and steering device, in case a gas is ejected from an inflator, the gas is ejected to the upper and lower directions (or only lower direction) from the gas flow-out ports disposed on the driver's side relative to the steering wheel plane. A flowing direction of the gas is hardly changed by the steering wheel, so that the air bag is quickly expanded in the upper and lower directions. In case an opening area of the lower side gas flow-out port is made larger than that of the upper side gas flow-out port of the inner bag, or only the lower side gas flow-out port is provided at the inner bag, the lower side of the air bag is expanded quicker than the upper side thereof.

In the present invention, it is preferable that the flow-out ports are positioned closer to the steering wheel side than a middle between the steering wheel plane and the farthest projected portion from the steering wheel surface of the air bag at a time of the largest expansion of the air bag.

DETAILED DESCRIPTION OF PREFERRED EMBODIMENTS

Figure 1:
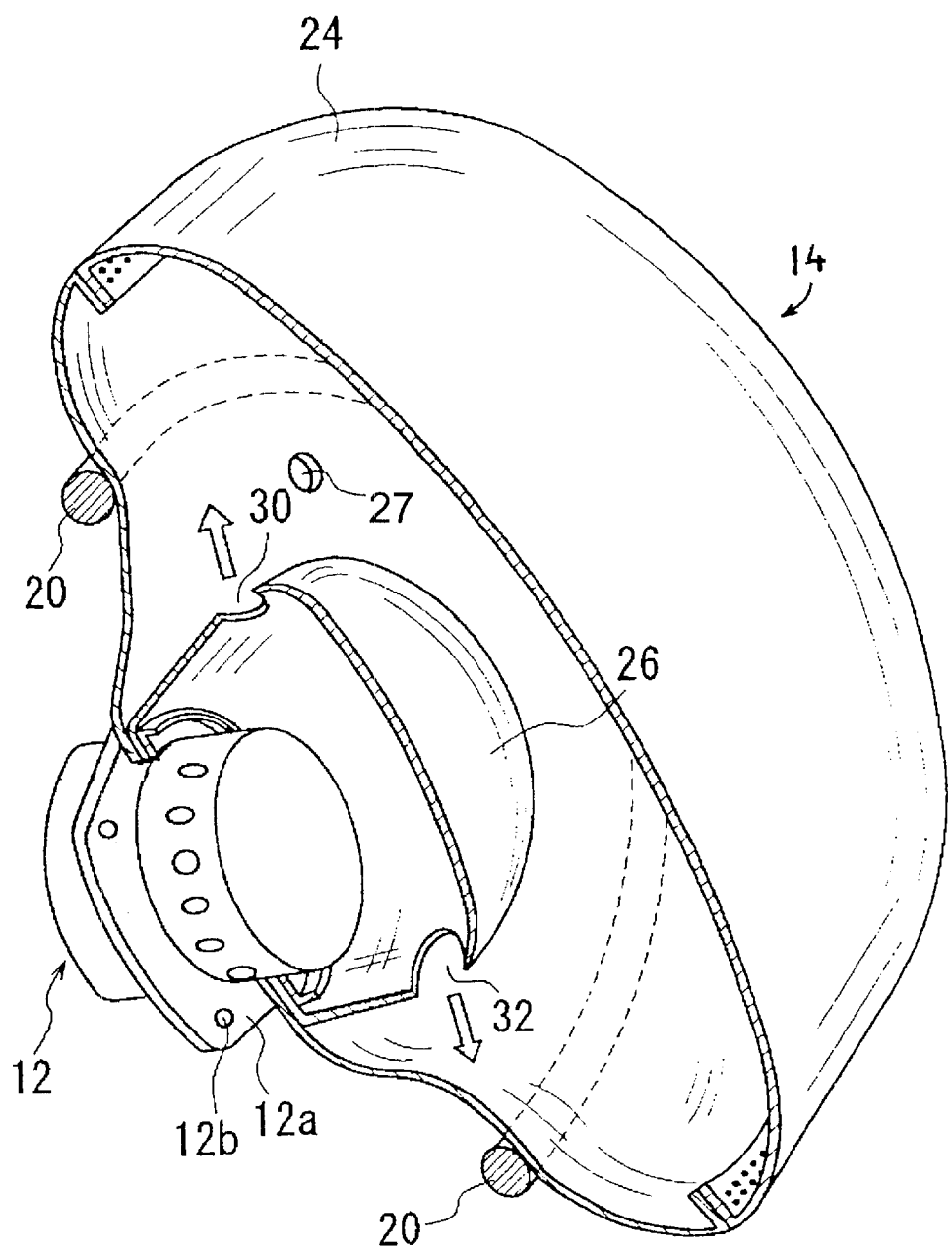
FIG. 1 is a sectional perspective view showing an air bag device of an embodiment according to the invention.
Figure 2:
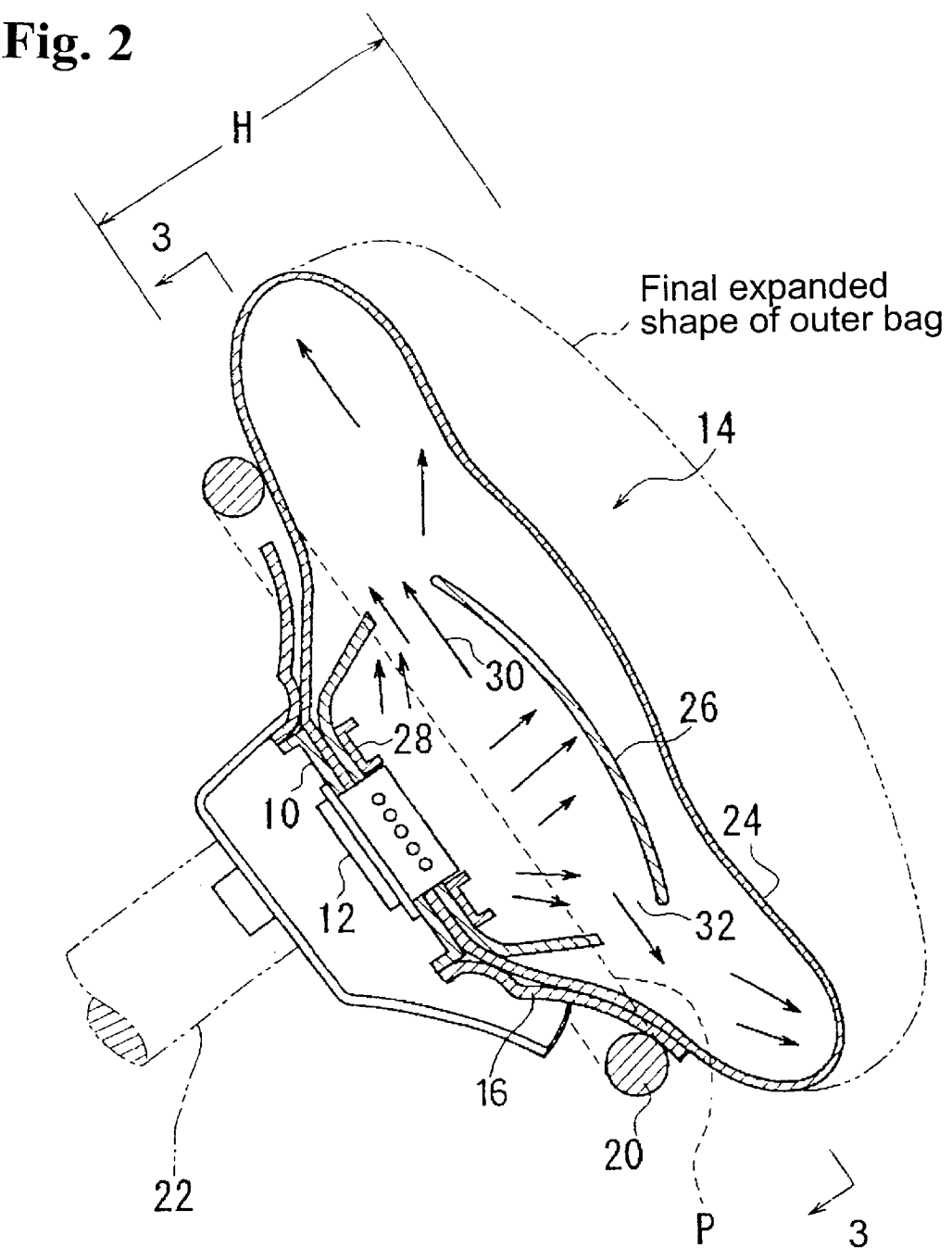
FIG. 2 is a vertical sectional view showing the air bag device of FIG. 1.
Figure 3:
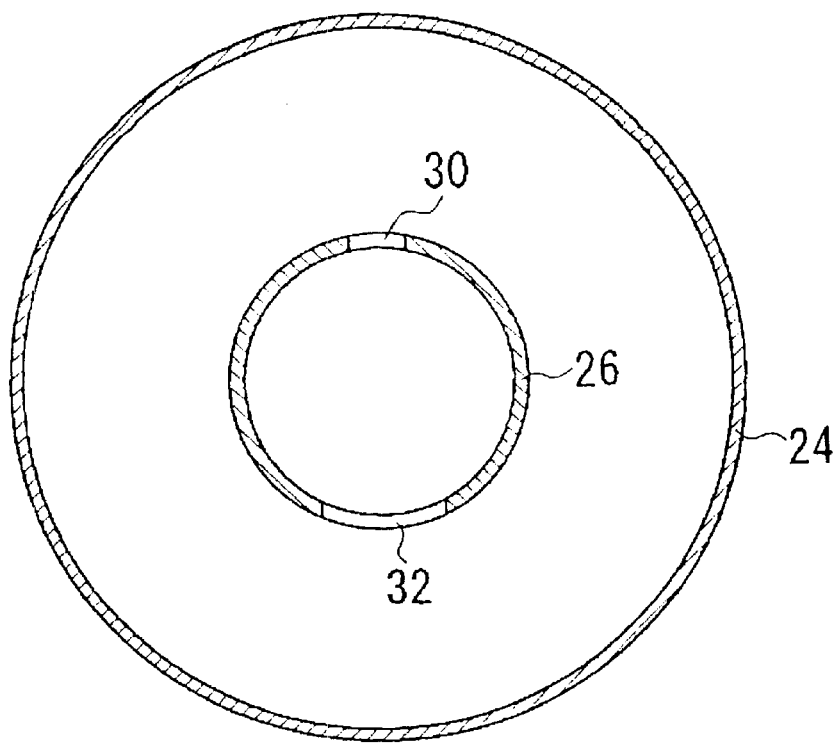
FIG. 3 is a sectional view taken along line 3—3 in FIG. 2.
Figure 4:
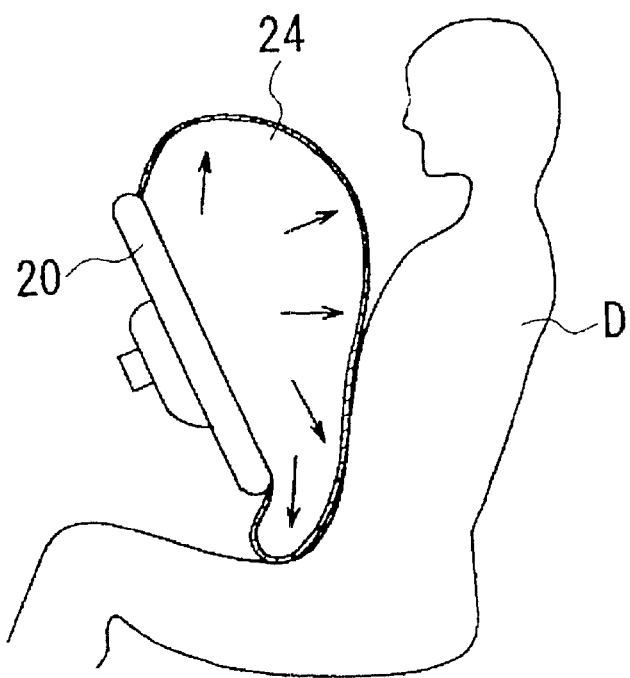
FIG. 4 is a side view showing a state where the air bag device shown in FIG. 1 is expanded.

Hereunder, embodiments of the invention will be described with reference to the accompanying drawings. FIG. 1 shows an air bag and an air bag device of an embodiment according to the invention, wherein the air bag is expanded. FIG. 2 is a sectional view, similar to FIG. 1, wherein an outer bag is in the middle of expansion. FIG. 3 is a sectional view taken along line 3—3 in FIG. 2. FIG. 4 is a side view showing a relationship between an expanded air bag and a driver.

The air bag device includes a retainer 10 (FIG. 2), an inflator 12, an air bag 14, and a module cover 16 (FIG. 2) for covering the air bag 14. The inflator 12 and air bag 14 are attached to the retainer 10. The air bag device is disposed inside a steering wheel 20. As shown in FIG. 2, the steering wheel 20 is connected to a steering column 22.

The air bag 14 includes an outer bag 24 and an inner bag 26. Both bags 24, 26 are connected to the retainer 10 through a holding ring 28. Stud bolts (not shown) project from the holding ring 28. The stud bolts pass through bolt holes formed in the inner bag 26 and the outer bag 24 and openings formed in the retainer 10, and nuts are screwed thereto to thereby connect the bags 24, 26 to the retainer 10. Incidentally, as shown in FIG. 1, by inserting the bolts into bolt holes 12b provided in a flange 12a of the inflator 12, the inflator 12 is also connected to the retainer 10.

The outer bag 24 is provided with a vent hole 27 for allowing the gas in the outer bag 24 to flow out when the driver hits the expanded outer bag 24. The inner bag 26 includes an upper side flow-out port 30 for allowing the gas from the inflator 12 to flow out in an upper direction along a steering wheel plane P; and a lower side flow-out port 32 for allowing the gas from the inflator 12 to flow out in a lower direction along the steering wheel plane P. An opening area of the lower side flow-out port 32 is larger than that of the upper flow-out port 30. The flow-out ports 30, 32 are positioned on a driver's side relative to the steering wheel plane P when the inner bag 26 is expanded to the maximum shape.

In the air bag and air bag device having the air bag thus structured, in case a vehicle encounters an emergency situation, such as collision and rolling or turning over, the inflator 12 ejects a gas to start expanding the air bag 14. As the air bag 14 starts expanding, the module cover 16 bursts and the air bag 14 is expanded. In this case, the gas first expands the inner bag 26, and then expands the outer bag 24 through the ports 30, 32 of the inner bag.

In a state after the inner bag 26 is expanded, since the flow-out ports 30, 32 are positioned on the side of the driver relative to the steering wheel plane P, the gas flowing out from the flow-out ports 30, 32 does not change the flowing directions by the steering wheel 20 to thereby flow along the steering wheel plane P. Therefore, the outer bag 24 is quickly expanded in upper and lower directions along the steering wheel plane P. After the outer bag 24 is expanded as explained above, the bag 24 is expanded toward the driver to become the finally expanded state.

Incidentally, in case the outer bag 24 is expanded in the upper and lower directions along the steering wheel plane, since the opening area of the lower side flow-out port 32 is larger than that of the upper side flow-out port 30, a larger quantity of the gas in the inner bag 26 flows out in the lower direction through the flow-out port 32. Therefore, the outer bag 24 expands in the lower direction quicker than the upper direction thereof. As a result, as shown in FIG. 4, the outer bag 24 quickly enters a narrow space between a lower end of the steering wheel 20 and the driver.

As is well known, the steering wheel 20 is disposed diagonally such that an upper side of the steering wheel 20 is spaced from a driver D. Also, a driver's posture is normally slightly reclined rearwardly such that a chest is located farther away from the steering wheel than an abdomen. Thus, the space between the lower end of the steering wheel 20 and the abdomen of the driver D is smaller than that between an upper portion of the steering wheel 20 and the chest portion of the driver.

In the present invention, the air bag sufficiently quickly enters the narrow space between the lower portion of the steering wheel and the driver's abdomen.

Incidentally, as shown in FIG. 2, in case a distance between the steering wheel plane P and the farthest portion of the outer bag 24 away from the steering wheel surface P in the finally expanded state is set as "H", it is preferable that the flow-out ports 30, 32 are disposed in an area closer to the steering wheel plane P than a position of ½ H.

Figure 5:
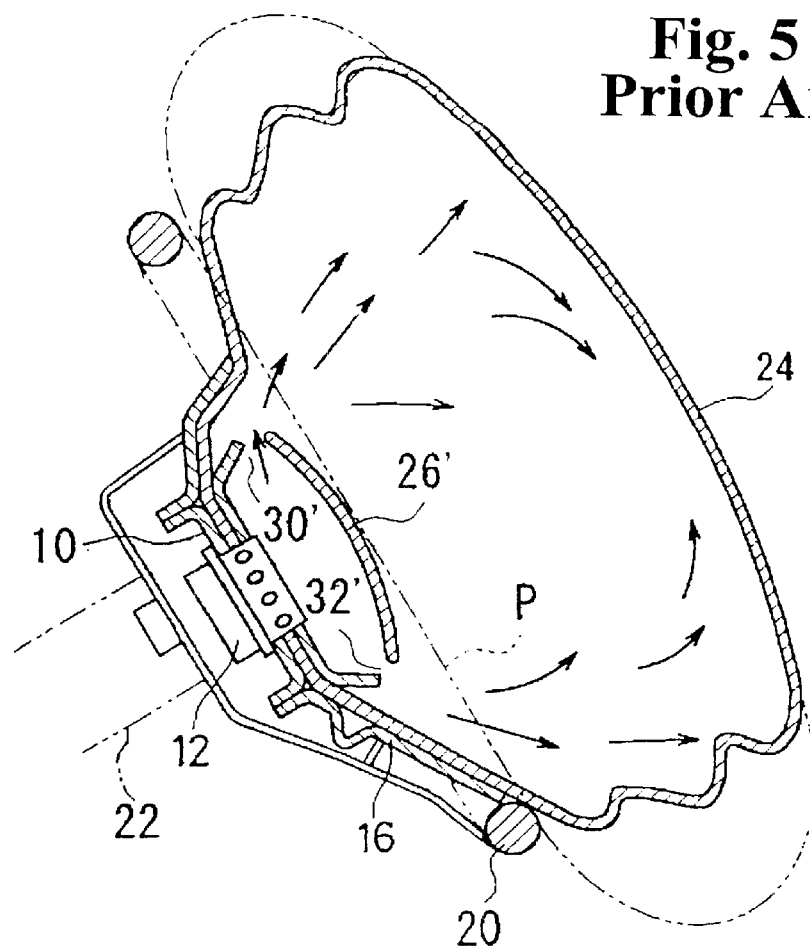
FIG. 5 is a sectional view showing a comparative example.

According to the invention, as described above, it is possible to allow the air bag to quickly expand between the steering wheel and the abdomen of the driver D, which will be more apparent from a comparative example shown in FIG. 5.

FIG. 5 is a sectional view showing a structure of an air bag device according to the comparative example, wherein flow-out ports 30', 32' of an inner bag 26' are disposed on a side of the steering column 22 relative to the steering wheel plane P. In case the flow-out ports 30', 32' are disposed in the retreated portion as described above, the gas flowing out through the flow-out ports 30', 32' changes the flowing directions to be directed toward the driver by the steering wheel 20, so that a speed with which the outer bag 24 is expanded in the upper and lower directions becomes slow.

Figure 6:
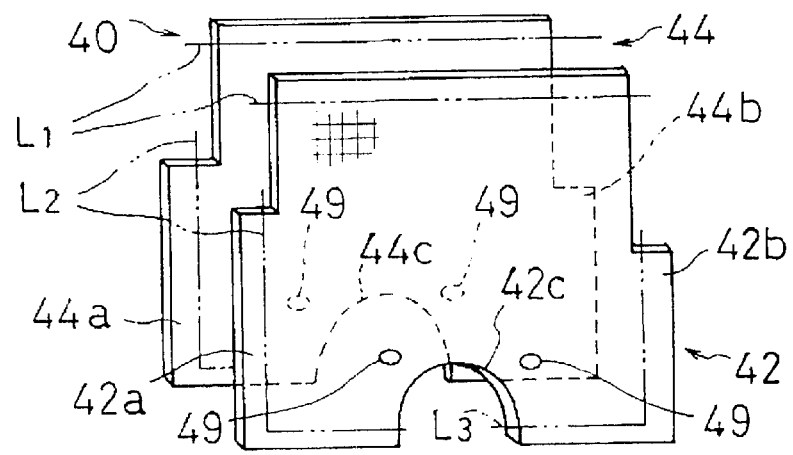
FIG. 6 is an exploded perspective view showing a structure of an inner bag.
Figure 7:
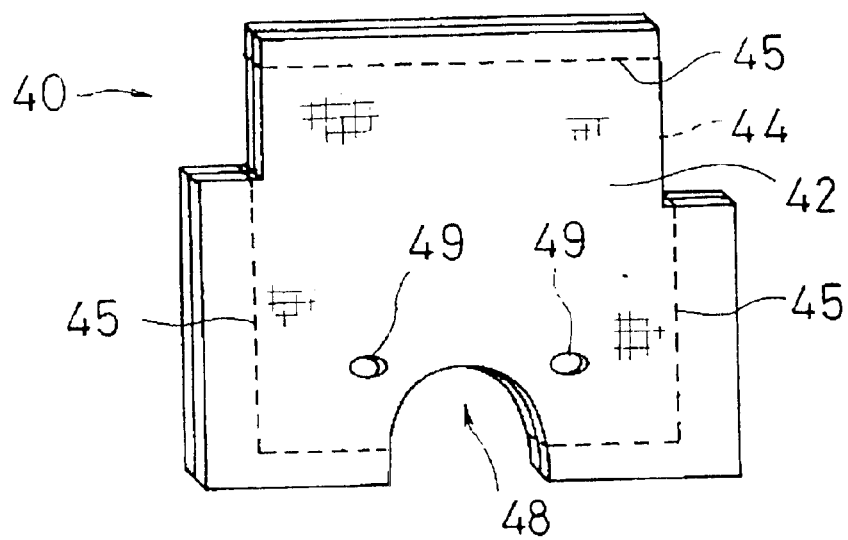
FIG. 7 is a perspective view of the inner bag shown in FIG. 6.
Figure 8:
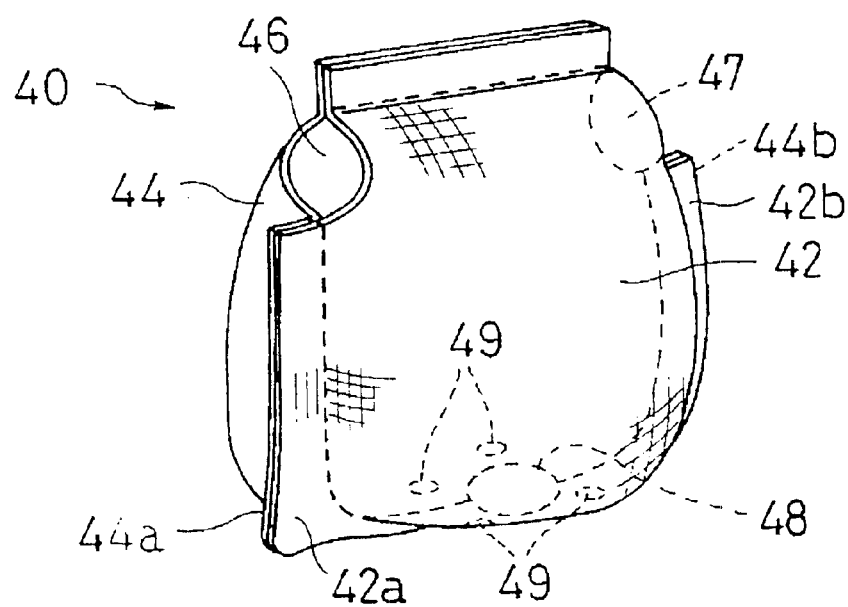
FIG. 8 is a perspective view in an expanded state of the inner bag shown in FIG. 6.

With reference to FIGS. 6 through 8, another suitable inner bag to be employed in the present invention is explained. An inner bag 40 as shown in FIGS. 6 through 8 is formed by sewing edge portions of two panels 42, 44 in a substantially rectangular shape together. As shown in FIG. 6, the panel 42 is provided with flange portions 42a, 42b with predetermined lengths extending along both side edges from a bottom side portion on a lower half side thereof. The flange portion 42a is longer than the flange portion 42b extending along a side edge opposite thereto. The panel 44 has a shape symmetrical to that of the panel 42, and is provided with flange portions 44a, 44b at both side edges thereof. The flange portions 44a, 44b have the same shape and arrangement as in the flange portions 42a, 42b of the panel 42.

The inner bag 40 is formed by piling or laminating the panels 42, 44 together, and sewing upper edge portions, lower edge portions and the flange portions with the same shapes along sewing lines $L_1$–$L_3$ with sewing threads 45. At this time, the respective panels 42, 44 are not connected at the side edges above the flange portions, so that the inner bag 40 is provided with flow-out ports 46, 47 formed of a pair of openings communicating with each other at the opposed positions.

Since the flow-out port 47 formed above the flange portions 42b, 44b has a gas releasing quantity larger than that of the flow-out port 46 formed above the opposed flange portions 42a, 44a, the flow-out port 47 is disposed as a lower side flow-out port for allowing the gas from the inflator (not shown) to flow out in the lower direction in the outer bag (not shown). On the other hand, the flow-out port 46 opposed thereto is disposed as an upper side flow-out port for allowing the gas from the inflator to flow out in the upper direction in the outer bag.

Incidentally, the respective panels 42, 44 are provided with substantially semi-circular notches 42c, 44c at centers of the lower side edge portions thereof. When the panels 42, 44 are connected together at the lower edge side portions, an opening 48 for the inflator in a circular shape is formed. Also, in an area around the opening 48, through-holes 49 for allowing the stud bolts (not shown) of the holding ring to pass therethrough are provided.

Figure 9:
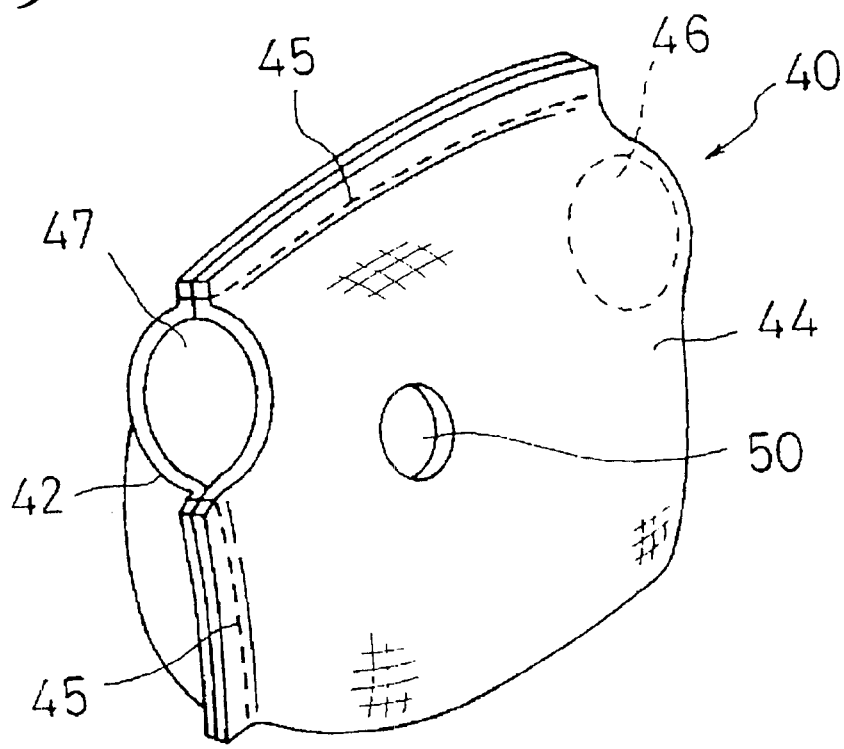
FIG. 9 is a perspective view showing a modified example of the inner bag.

In the inner bag 40 structured as described above, the upper side flow-out port and the lower side flow-out port are formed without connecting the parts of both side portions of the respective panels 42, 44 piled together, so that a hole making process for forming the flow-out ports is not required and the inner bag can be produced at a low cost. Of course, if necessary, as shown in FIG. 9, flow-out ports 50 can be provided at the respective panels and used as the lower side flow-out ports together with the flow-out port 47. Also, since the inner bag 40 has a simple structure such that only edges around two panels are connected together, cloth members required for constituting the inner bag 40 are sufficient in a small quantity, and the inner bag can be effectively made therefrom.

Figure 10:
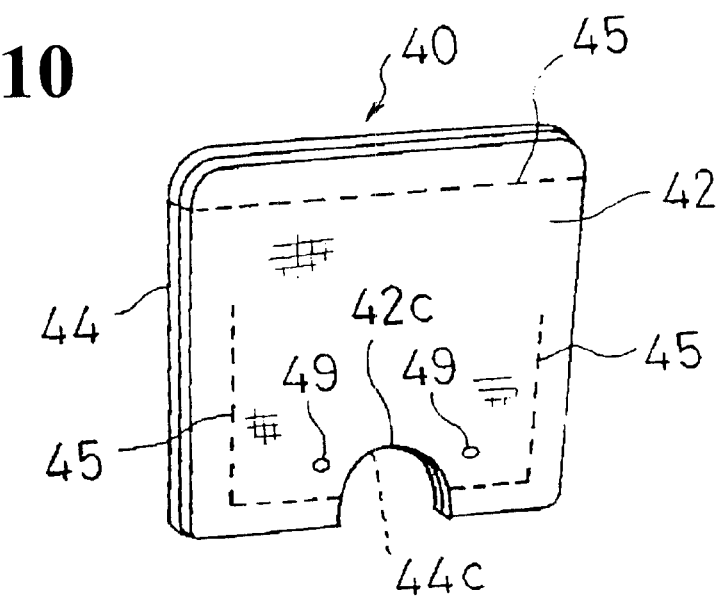
FIG. 10 is a perspective view showing another modified example of the inner bag.

In the present embodiment, the flange portions provided at both side edge portions of the respective panels 42, 44 may be omitted. In this case, as shown in FIG. 10, the respective panels 42, 44 are piled together and sewed by sewing threads 45 along the circumferential edge portions of both panels except for predetermined upper areas of both side edge portions and notches 42C, 44C thereof, so that an inner bag 40 having a pair of flow-out ports can be easily produced. Also, in this case, gas releasing quantities of the upper side flow-out port and lower side flow-out port can be easily varied by changing the arrangement of the sewing threads 45.

Also, in the present embodiment, although the circumferential edge portions around the respective panels 42, 44 are connected together by the sewing threads 45, the connecting method of the respective panels is not limited thereto, and the respective panels may be bonded or welded together.

Figure 11:
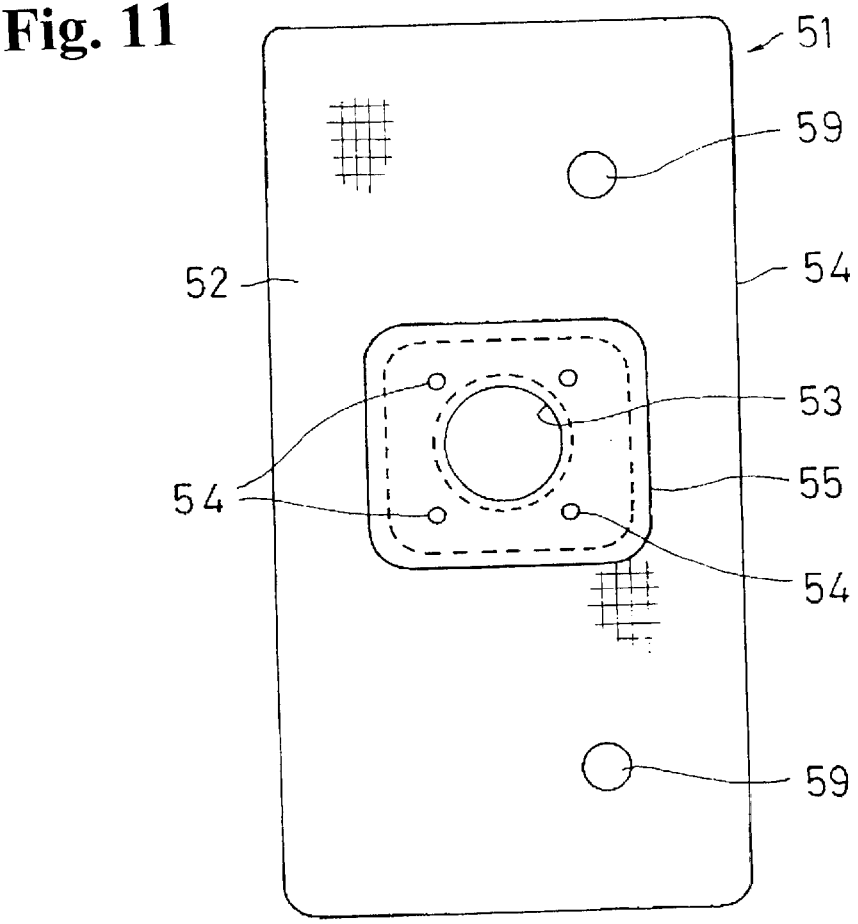
FIG. 11 is a plan view of a panel, in an unfolded condition, for constituting a still modified example of the inner bag.
Figure 12:
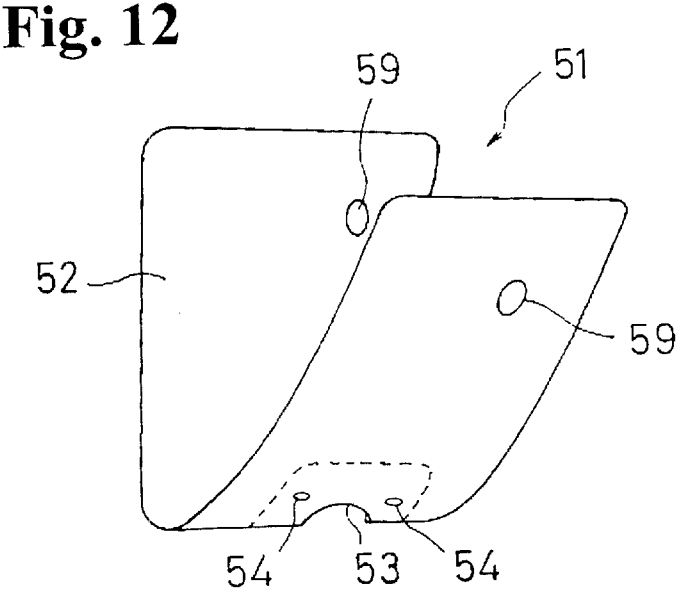
FIG. 12 is a perspective view of the panel shown in FIG. 11 in the middle of constituting the inner bag.
Figure 13:
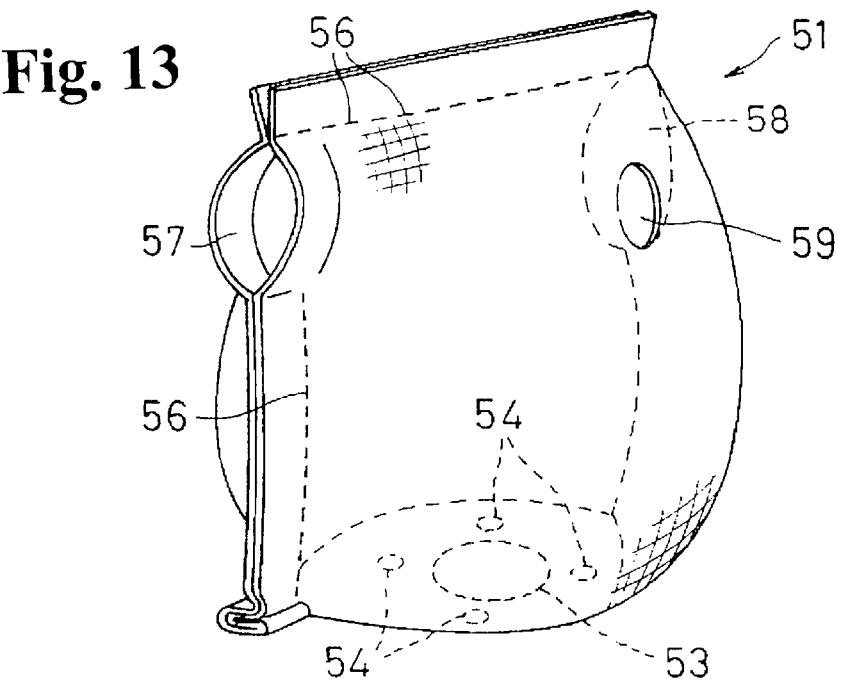
FIG. 13 is a perspective view of the inner bag shown in FIG. 11 at a time of expansion.

An inner bag 51 as shown in FIGS. 11 through 13 is formed of a panel 52 in a substantially rectangular shape. The panel 52 is folded at a center thereof so that one half side of the panel in a longitudinal direction is piled on the other half side thereof, and the piled circumferential edge portions are sewed together to constitute the inner bag 51.

An opening 53 for the inflator is disposed at a center of the panel 52, and a plurality of through-holes 54 for allowing the stud bolts (not shown) of a holding member to pass therethrough is provided around the opening 53. Also, in the present embodiment, a reinforcing cloth 55 is provided in the circumferential edge portions of the opening 53 and the through-holes 54.

The panel 52 is folded at the center; the one half side of the panel in the longitudinal direction is piled on the other half side thereof; and the piled side edge portions are sewed by the sewing threads 56, bonded or welded together. At this time, predetermined areas of the edge portions of the one half side and the other half side in both side edge portions of the panel 52 in the longitudinal direction are piled in a non-connecting state to thereby form a pair of flow-out ports 57, 58 for communicating an inside with an outside of the inner bag 51. In the inner bag 51, flow-out ports 59 are provided close to the flow-out port 58, so that the lower side flow-out port for allowing a larger quantity of gas to flow out is formed by the flow-out ports 58, 59 on the side of the flow-out port 58.

In the present embodiment, since the inner bag 51 is formed of one panel 52, it can be easily produced at a very low cost.

Figure 14:
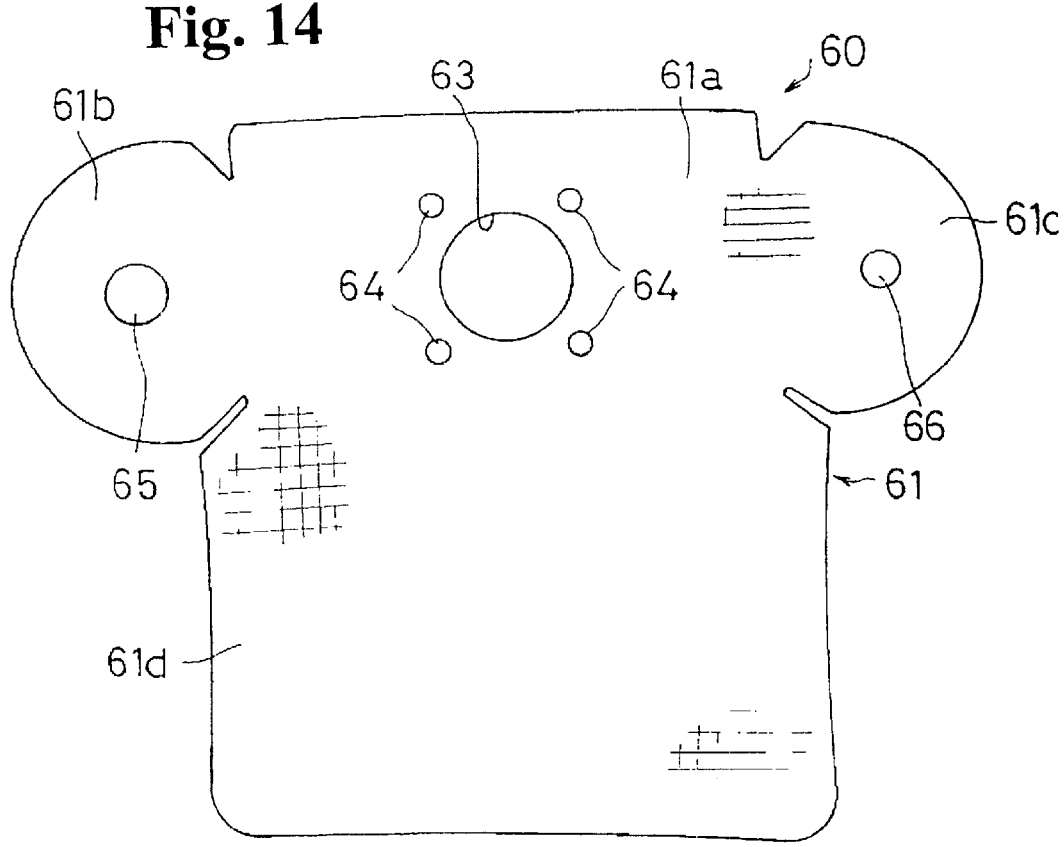
FIG. 14 is a plan view of a panel, in an unfolded condition, for constituting a still modified example of the inner bag.
Figure 15:
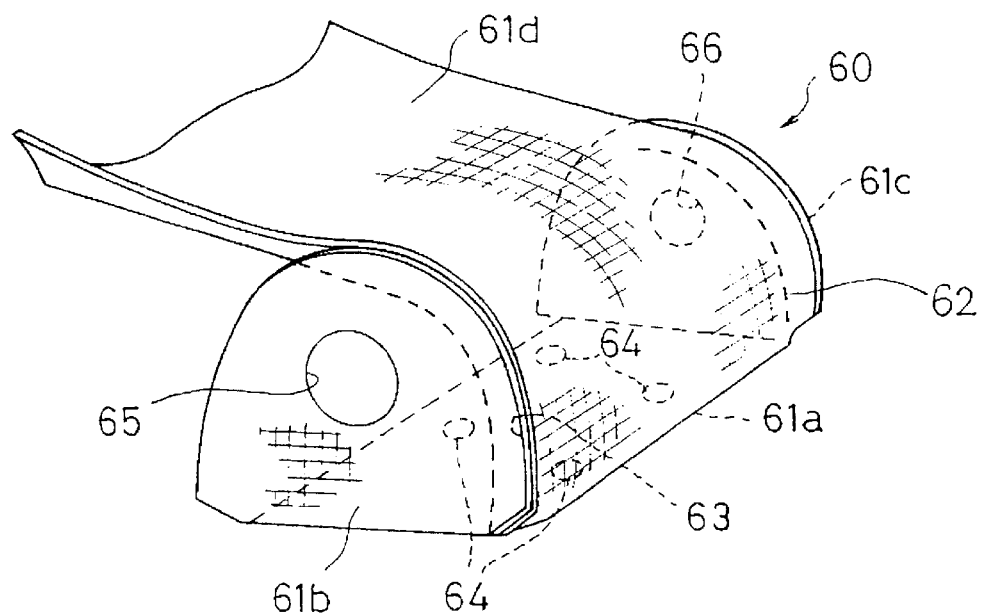
FIG. 15 is a perspective view of the panel shown in FIG. 14 in the middle of constituting the inner bag.
Figure 16:
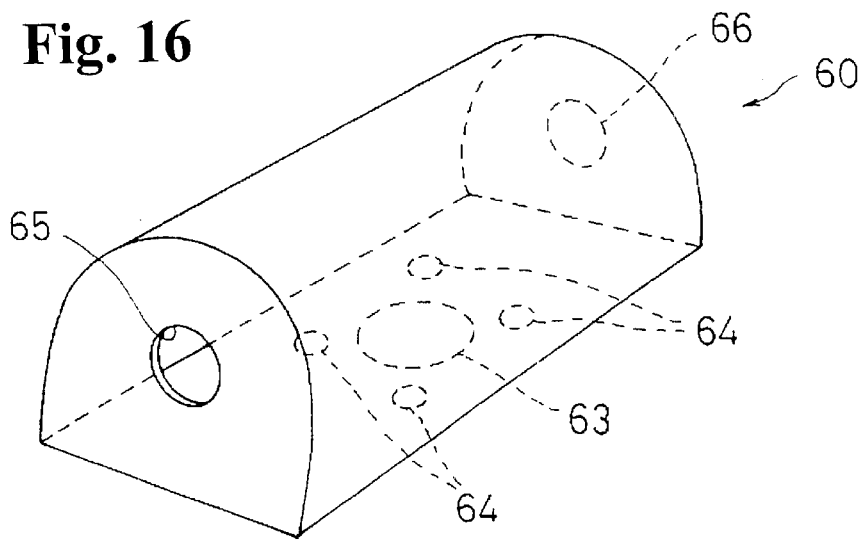
FIG. 16 is a perspective view showing the inner bag in FIG. 15.

An inner bag 60 as shown in FIGS. 14 through 18 is formed of a piece of panel 61, which has an unfolded shape as shown in FIG. 14. As shown in FIG. 15, a pair of substantially semi-circular side wall panels 61b, 61c disposed on both sides of a rectangular bottom panel 61a and a belt-like circumferential wall panel 61d extending from the other side of the bottom panel 61a are raised. Then, the side edges on both sides of the circumferential wall panel 61d are piled along the semi-circular circumferential edges of the pair of the side wall panels 61b, 61c, and the piled edge portions are sequentially sewed by sewing threads 62, bonded or welded together. Finally, an edge portion of a forward side of the circumferential wall panel 61d is connected to the remaining side of the bottom panel 61a to thereby complete the inner bag 60. Thereafter, the inner bag 60 may be used by reversing itself, i.e. inside-out, so that the respective connected edge portions are disposed inside the bag as shown in FIG. 16.

The bottom panel 61a of the panel 61 is provided with an opening 63 for receiving the inflator therein, and through-holes 64 for allowing the stud bolts (not shown) of the holding ring 68 to pass therethrough are provided around the opening 63. Also, the side wall panels 61b, 61c are provided with flow-out ports 65, 66, respectively. The flow-out port 65 has a diameter greater than that of the flow-out port 66 to discharge a larger quantity of gas, and used as the lower side flow-out port. On the other hand, the flow-out port 66 is used as the upper side flow-out port.

Figure 17:
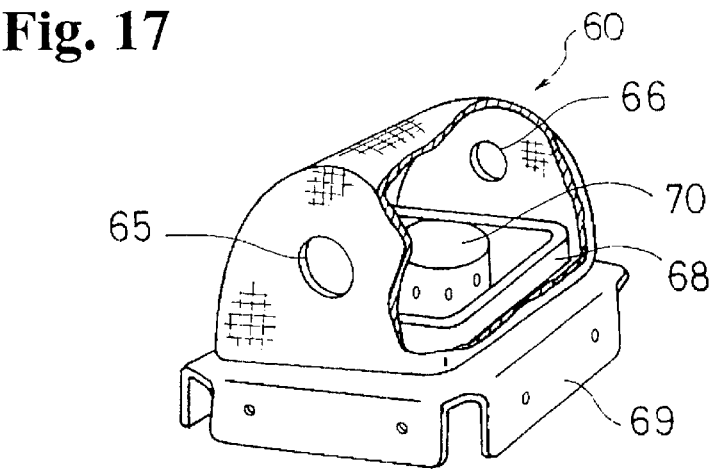
FIG. 17 is a partial sectional perspective view showing a connecting structure of the inner bag in FIG. 15 and a retainer.
Figure 18:
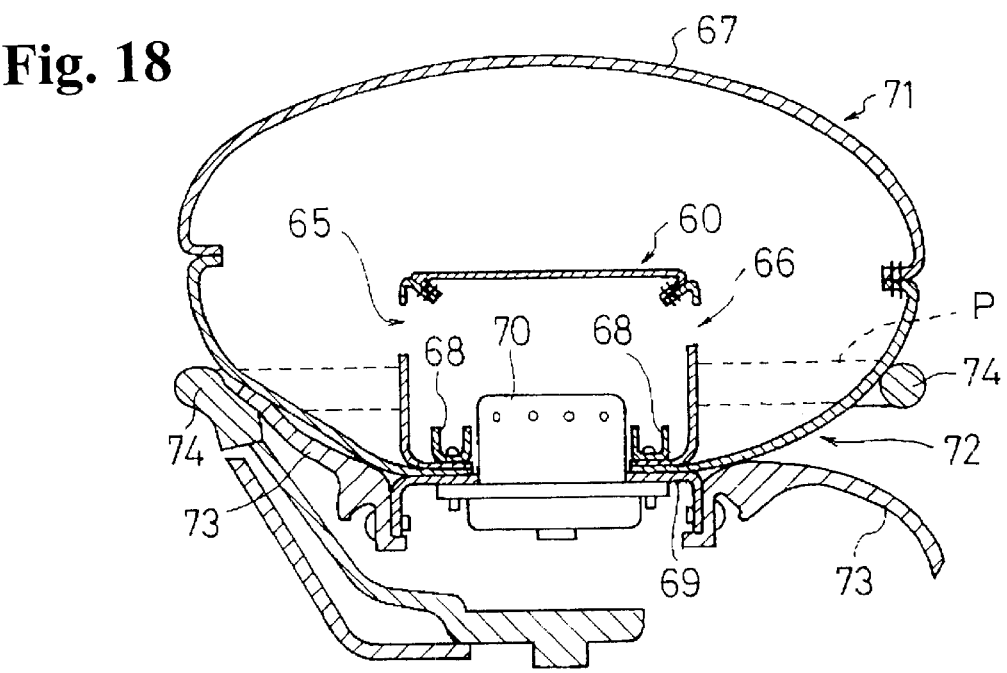
FIG. 18 is a sectional view of an air bag device having the inner bag shown in FIG. 15.

After the inner bag 60 is housed in an outer bag 67, as shown in FIGS. 17 and 18, the inner bag 60 is connected to a retainer 69 together with the outer bag 67 through a holding ring 68. Incidentally, the outer bag 67 is not shown in FIG. 17. Stud bolts project from the holding ring 68. The stud bolts pass through bolt holes provided at the inner bag 60 and the outer bag 67 and openings provided at the retainer 69; and nuts are screwed thereto to thereby connect the air bags 60, 67 to the retainer 69. An air bag 71 is formed of the bags 60, 67. Incidentally, an inflator 70 is also connected to the retainer 69.

The outer bag 67 is provided with a vent hole 72 for allowing the gas in the outer bag 67 to flow out when the driver hits the expanded outer bag 67. The flow-out port 66 provided at the inner bag 60 faces in the upper direction in the outer bag 67, and allows the gas from the inflator 70 to flow out in the upper direction relative to the steering wheel plane P. On the other hand, the flow-out port 65 faces in the lower direction in the outer bag 67, and allows the gas from the inflator 70 to flow out in the lower direction. The flow-out ports 65, 66 are positioned on the driver's side relative to the steering wheel plane P when the inner bag 60 is expanded to its maximum shape.

In the air bag provided with the inner bag 60 thus structured and the air bag device with the air bag, in case a vehicle encounters an emergency situation, such as a collision and rolling, the inflator 70 ejects a gas to start expansion of the air bag 71. As the air bag 71 starts expanding, a module cover 73 bursts and the air bag 71 is expanded. In this case, the gas first expands the inner bag 60, passes through the flow-out ports 65, 66 of the inner bag, and expands the outer bag 67.

In the state after the inner bag 60 has expanded, since the flow-out ports 65, 66 are positioned on the driver's side relative to the steering wheel plane P, the gas discharged from the flow-out ports 65, 66 does not change the flowing directions by the steering wheel 20, and flows along the steering wheel plane P. Therefore, the outer bag 67 quickly expands in the upper and lower directions along the steering wheel plane P. After the outer bag 67 thus expands in the upper and lower directions, the outer bag 67 extends toward the driver to become the finally expanded state.

Incidentally, when the outer bag 67 extends in the upper and lower directions along the steering wheel plane as described above, since an opening area of the lower side flow-out port 65 is larger than that of the upper side flow-out port 66, a large quantity of the gas in the inner bag 60 is discharged in the lower direction through the flow-out port 65. Therefore, the outer bag 67 expands more quickly in the lower direction than in the upper direction. Thus, in the present embodiment, the air bag expands sufficiently quickly to enter a narrow space between a lower portion of the steering wheel and the driver's abdomen.

Figure 19:
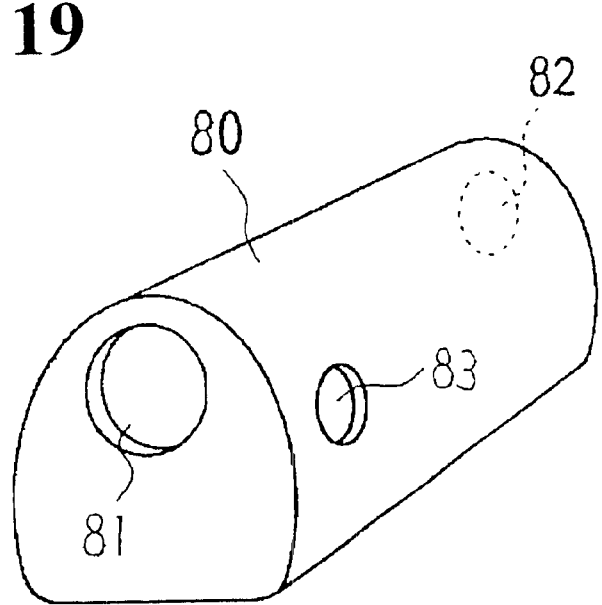
FIG. 19 is a perspective view of a still different inner bag.

An inner bag 80 as shown in FIG. 19 has a substantially semi-cylindrical shape similar to the inner bag 60, and includes flow-out ports 81, 82 on both side end surfaces and flow-out ports 83 on a side surface as a lower side. A total opening area of the flow-out ports 81, 83 is larger than the opening area of the flow-out port 82.

Figure 20:
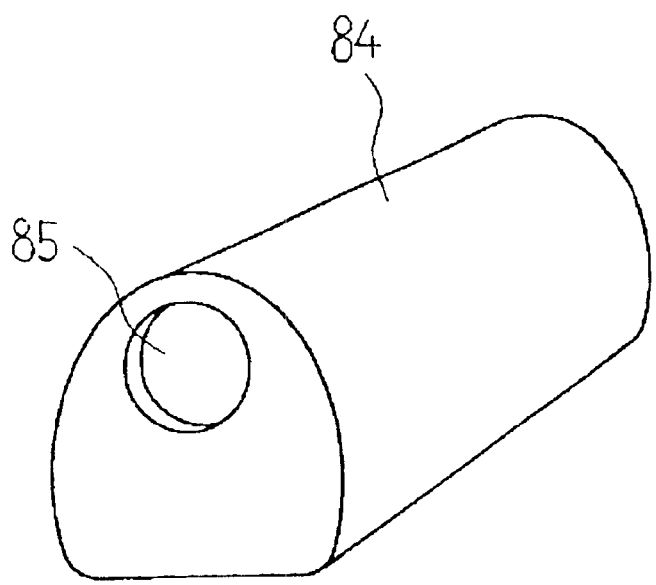
FIG. 20 is a perspective view of a still different inner bag.

An inner bag 84 as shown in FIG. 20 has a substantially semi-cylindrical shape, and includes a flow-out port 85 on only one side surface at a lower side in the air bag.

Figure 21:
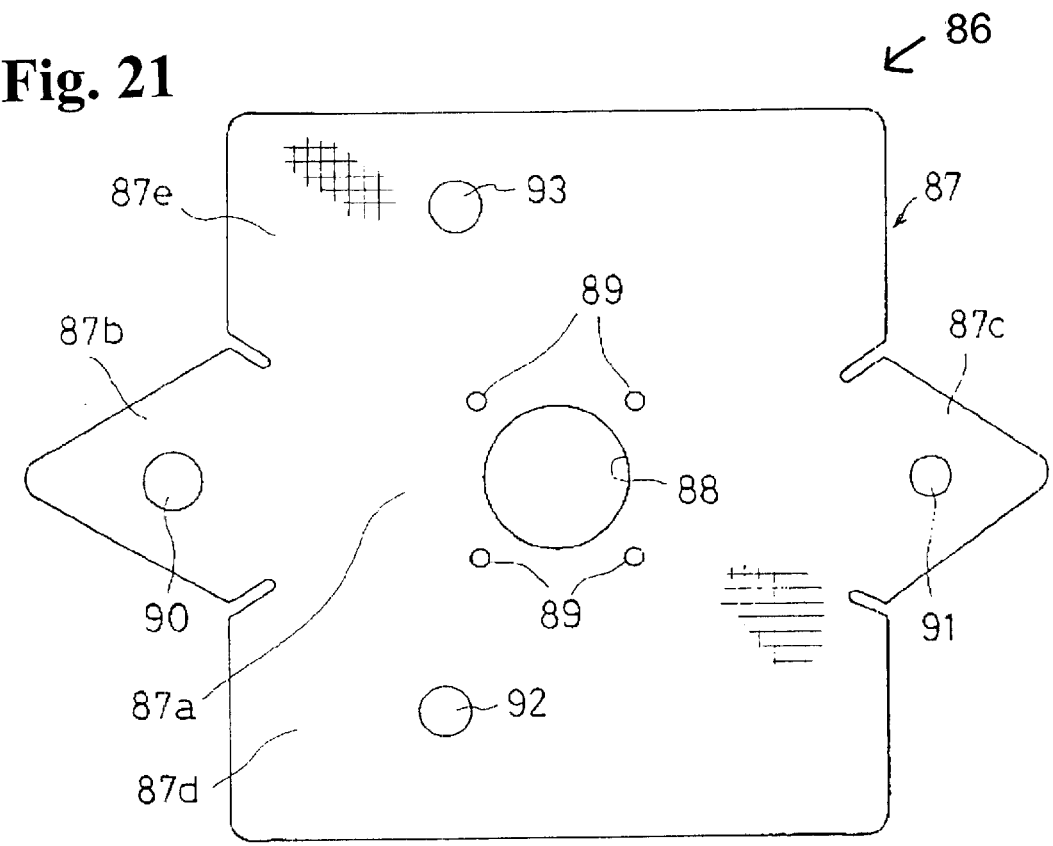
FIG. 21 is a plan view of a panel, in an unfolded condition, for constituting a still different inner bag.
Figure 22:
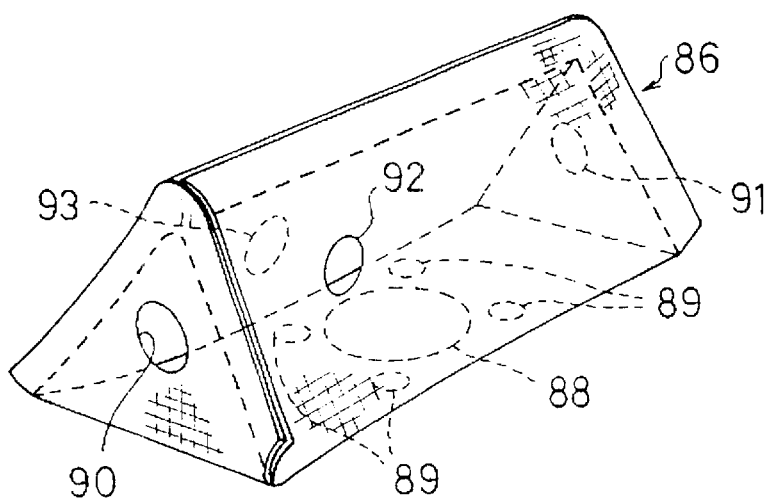
FIG. 22 is a perspective view of the inner bag shown in FIG. 21.

An inner bag 86 as shown in FIGS. 21 and 22 has a substantially trigonal prism. The inner bag 86 is formed of a panel 87 as shown in FIG. 21, and includes a bottom panel 87a in a substantially rectangular shape; a pair of side wall panels 87b, 87c in a substantially triangular shape extending from both short side portions of the rectangular bottom panel 87a; and a pair of circumferential wall panels 87d, 87e in a substantially rectangular shape extending from both long side portions of the bottom panel 87a. The side wall panels 87b, 87c and circumferential wall panels 87d, 87e are raised; inclined portions of the respective side wall panels 87b, 87c and short side portions of the respective circumferential wall panels 87d, 87e are sewed by sewing threads 88, bonded or welded together at their edge portions; and long side portions at the forward end sides of the respective circumferential wall panels 87d, 87e are connected at their edge portions in the same manner as described above to thereby constitute the inner bag 86.

The bottom panel 87a of the panel 87 is provided with an opening 88 at a center thereof for an inflator, and a plurality of through-holes 89 through which stud bolts (not shown) of a holding ring pass is provided around the opening 88. Also, the respective side wall panels 87b, 87c are provided with flow-out ports 90, 91, respectively. In the panel 87, also, flow-out ports 92, 93 are provided in the circumferential wall panels 87d, 87e closer to the edge portions of the side wall panel 87b, respectively. A total opening area of the flow-out ports 90, 92, 93 is larger than the opening area of the flow-out port 91.

Figure 23:
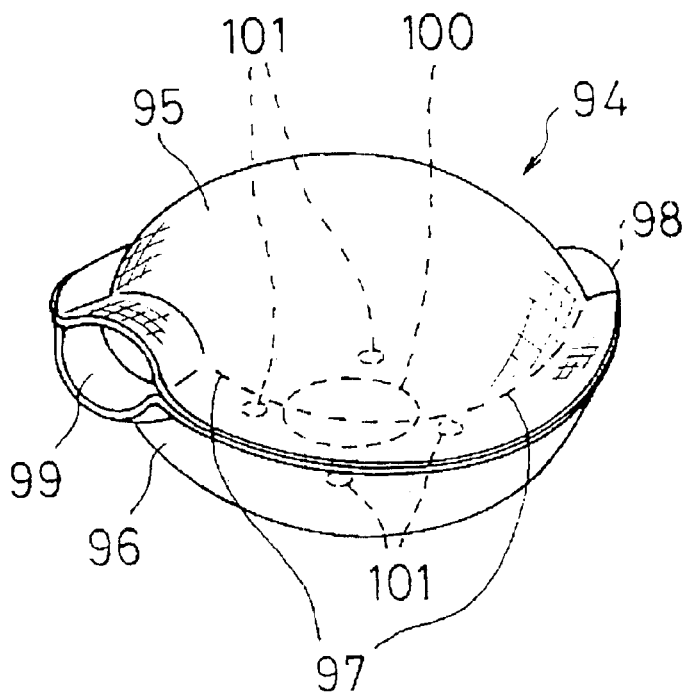
FIG. 23 is a perspective view of a still different inner bag in an expanded condition.
Figure 24:
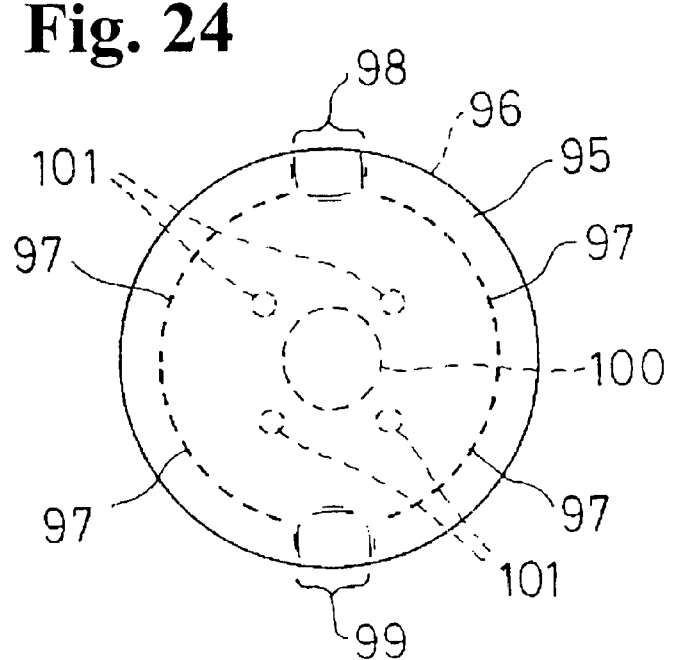
FIG. 24 is a plan view of the inner bag shown in FIG. 23.

An inner bag 94 as shown in FIGS. 23 and 24 is formed by piling a circular front side panel 95 and a circular rear side panel 96; and sewing circumferential edge portions thereof with sewing threads 97, bonding or welding. A pair of areas facing each other in a diametral direction of the circumferential edge portions of the front side panel 95 and the rear side panel 96 is left open to form flow-out ports 98, 99 for allowing an inside of the inner bag 94 to communicate with an outside thereof.

In the flow-out ports 98, 99 thus formed, the flow-out port 98 has a gas releasing quantity larger than that of the flow-out port 99 to thereby discharge a larger quantity of the gas when compared with that of the flow-out port 99. The flow-out port 98 is disposed inside an outer bag (not shown) as a lower side flow-out port facing in the lower direction, and the flow-out port 99 is disposed as an upper side flow-out port facing in the upper direction.

The rear side panel 96 is provided with an opening 100 at a center thereof for an inflator (not shown), and plural through-holes holes 101 around the opening 100 for allowing stud bolts of a holding ring to pass therethrough. The rear side panel 96 is connected to a retainer (not shown) of an air bag device by the holding ring (not shown) together with the outer bag.

In the present embodiment, another flow-out port may be provided near the flow-out port 98 but spaced apart therefrom.

Figure 25:
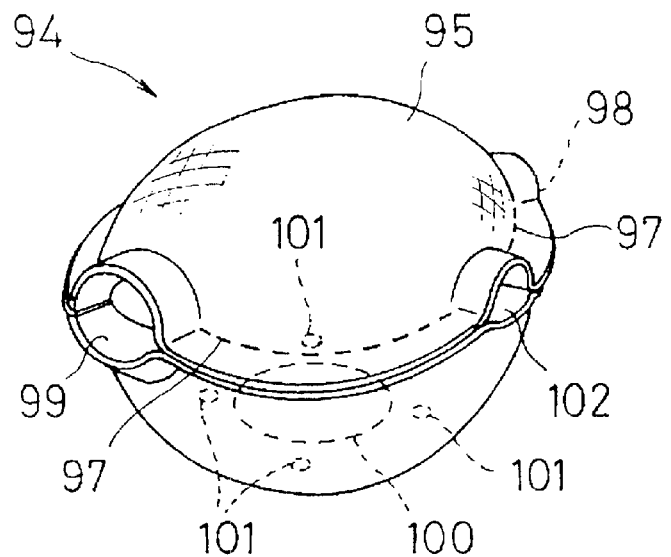
FIG. 25 is a perspective view showing a modified example of the inner bag shown in FIG. 23.
Figure 26:
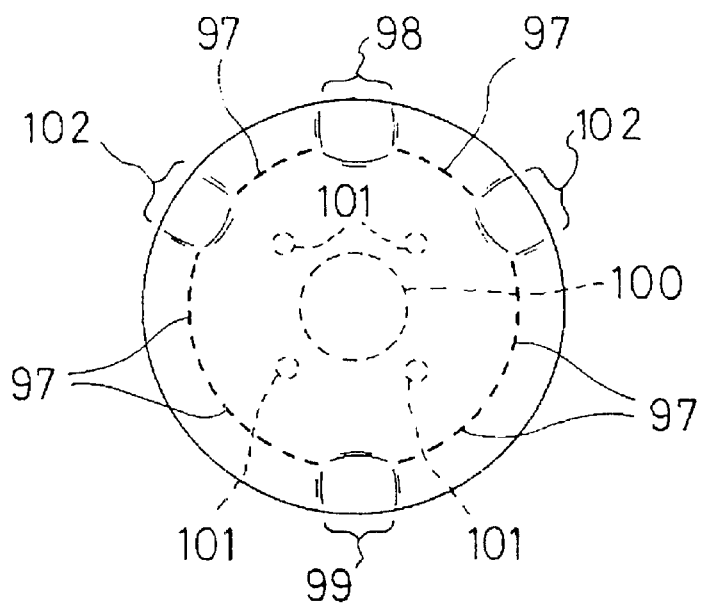
FIG. 26 is a plan view of the inner bag shown in FIG. 25.

For example, in FIGS. 25 and 26, the piled circumferential edge portions of the front side panel 95 and the rear side panel 96 of the inner bag 94 are provided with a pair of non-connected portions disposed on both sides of the flow-out port 98 while spacing apart therefrom. With the pair of the non-connected areas, a pair of flow-out ports 102 is formed near but spaced apart from the flow-out port 98, similar to the flow-out ports 98, 99. A total gas releasing quantity of the flow-out ports 98, 102 is larger than the gas releasing quantity of the flow-out port 99.

In the inner bag 96 thus structured, since the circumferential edge portions piled together of the front side panel and the rear side panel are provided with non-connecting areas to thereby form the flow-out ports, number of the flow-out ports and releasing quantities of the respective flow-out ports can be easily set.

An inner bag 103 as shown in FIGS. 27 through 30 is formed of a panel 104 in a cross shape having radial direction pieces 105–108 radially extending from four sides thereof.

Figure 27:
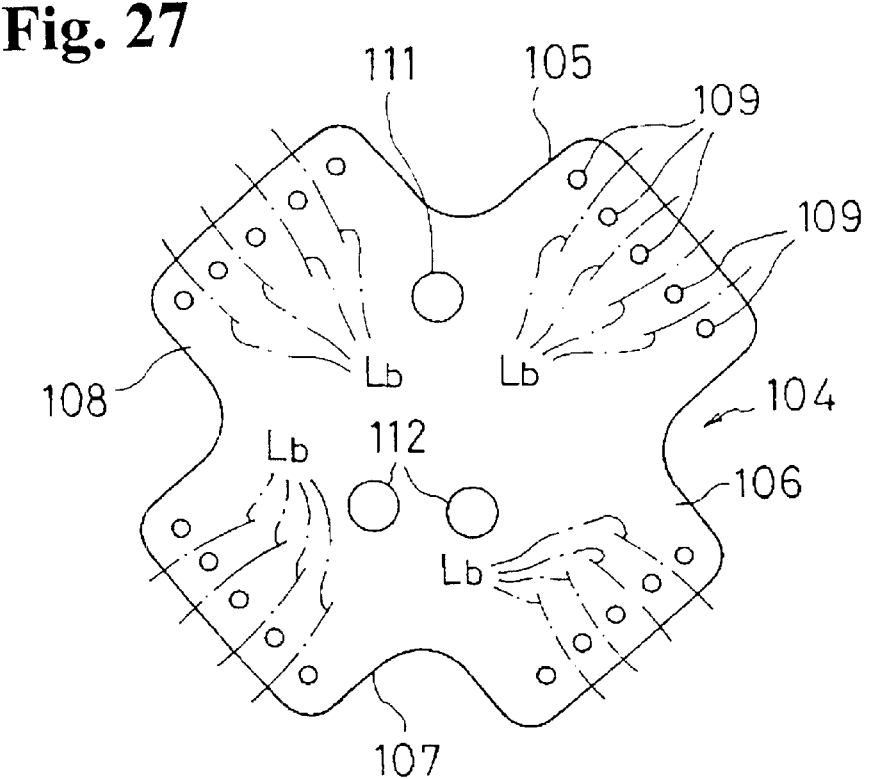
FIG. 27 is a plan view of a panel, in an unfolded condition, for constituting a still different inner bag.

The panel 104, as shown in FIG. 27, is provided with through-holes 109 for allowing stud bolts 110a of a holding ring 110 to pass therethrough along side edges on forward end sides of the respective radial direction pieces 105–108. In the present embodiment, each of the radial direction pieces 105–108 is provided with five through-holes 109 along the side edge on the forward end side thereof. Also, in the panel 104, a side edge portion at a boundary between the adjacent radial direction pieces has a circular arc according to a side edge portion of an opening 110b of the holding ring 110 for an inflator (not shown).

Figure 28:
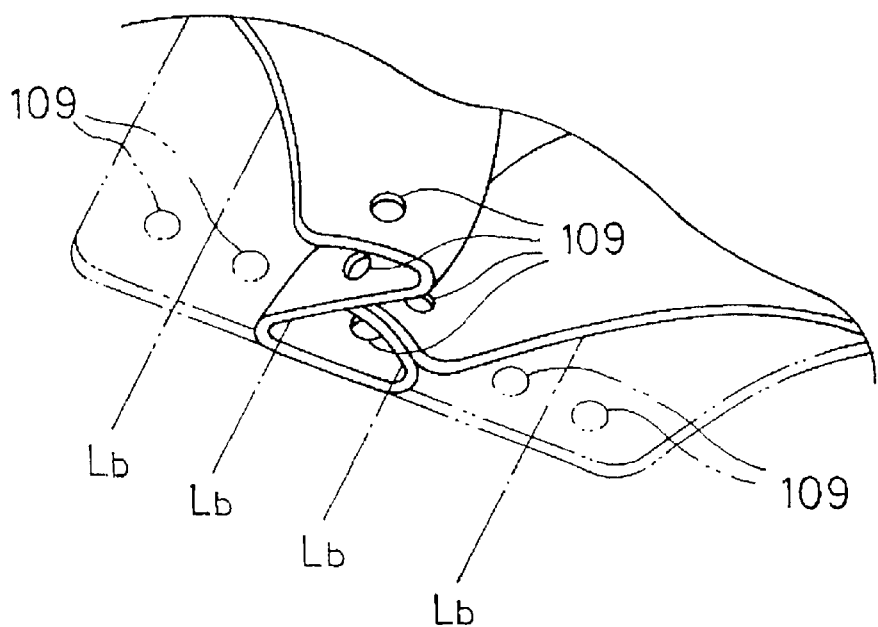
FIG. 28 is an enlarged view of a portion extending in a radial direction of the panel shown in FIG. 27.
Figure 29:
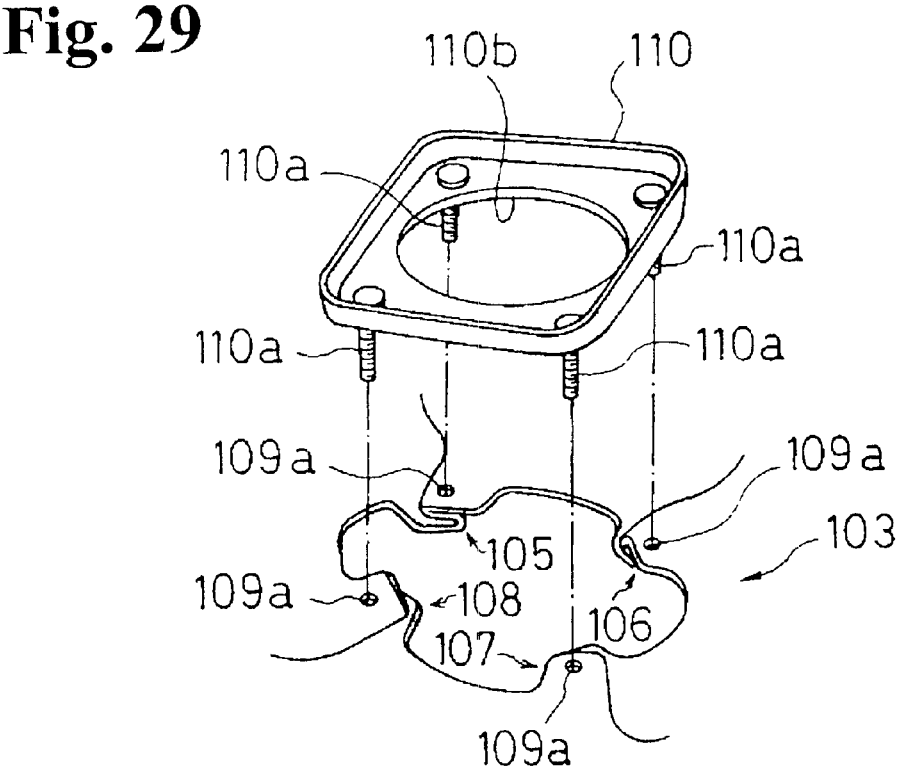
FIG. 29 is an exploded perspective view showing an engaging relationship between the inner bag shown in FIG. 27 and a holding ring.
Figure 30:
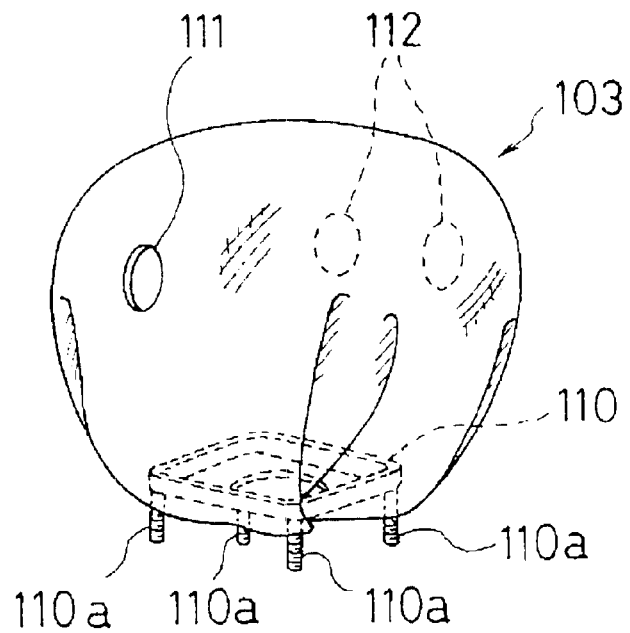
FIG. 30 is a perspective view of the expanded inner bag shown in FIG. 29.

The edge portions on the forward end sides of the respective radial direction pieces 105–108 are folded along the respective folding lines $L_b$, as shown in FIG. 28, to thereby form a series of through-holes 109a by coaxially piling the five through-holes 109 together. Since the respective radial direction pieces 105–108 are folded and piled together, the circumferential edge portions of the panel 104 are shortened to thereby form the inner bag 103 in a purse shape as shown in FIG. 30.

The holding ring 110 holds the circumferential edge portions of the panel 104 contracted as described above after the stud bolts 110a pass through the through-holes 109a provided on the forward end sides of the respective folded radial direction pieces 105 108, so that the panel 104 is fixed to a retainer (not shown) as the purse shape inner bag 103.

The panel 104 is provided with flow-out ports 111, 112 facing in upper and lower directions at predetermined positions inside an outer bag (not shown) when the panel 104 forms the inner bag 103 and is fixed to the retainer. In the present embodiment, the flow-out port 111 disposed on an upper side of the inner bag 103 is formed of one opening, and the flow-out port 112 disposed on a lower side of the inner bag 103 is formed of two openings. A total gas releasing quantity of the flow-out ports 112 is larger than the gas releasing quantity of the flow-out port 111.

In the present embodiment, although five bolt through-holes are piled together, the number of the through-holes may be increased or decreased depending on a size when the inner bag is formed. Incidentally, in the present embodiment, there is an advantage that sewing is not required.

In an inner bag 113 as shown in FIGS. 31 through 35, a lower half side of the inner bag 113 extends in the lower direction in a nozzle shape along an inner surface of a rear end side of an outer bag 114. Hereinafter, the lower half side of the inner bag 113 thus formed is referred to as "nozzle shape portion 113a".

Figure 31:
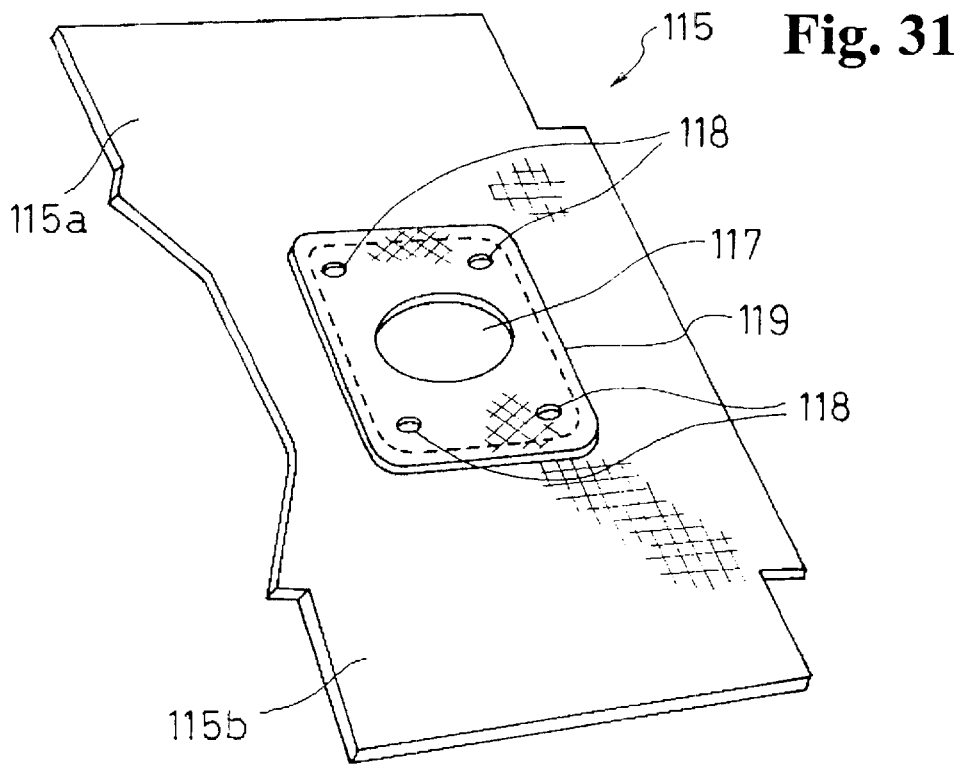
FIG. 31 is a perspective view of an unfolded panel for constituting a still different inner bag.
Figure 32:
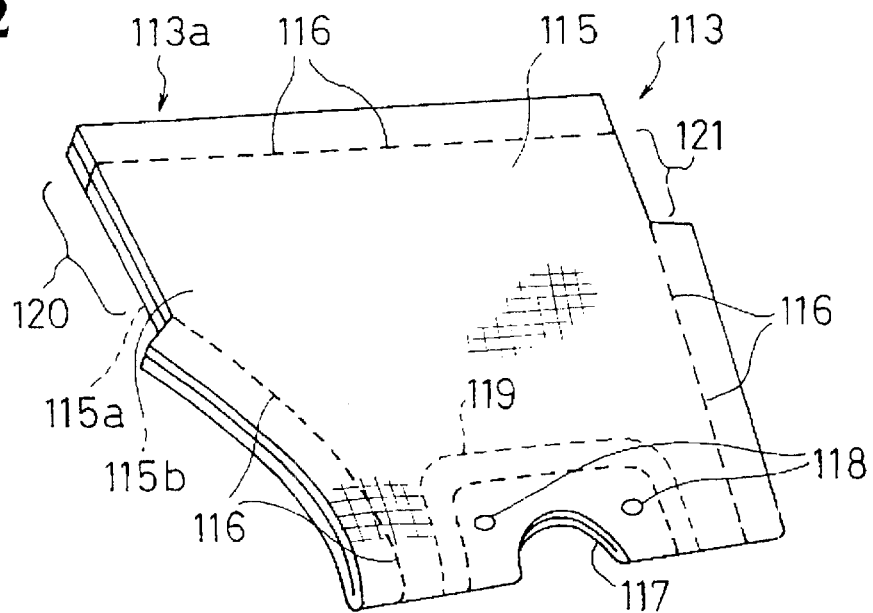
FIG. 32 is a perspective view of the inner bag shown in FIG. 31.
Figure 33:
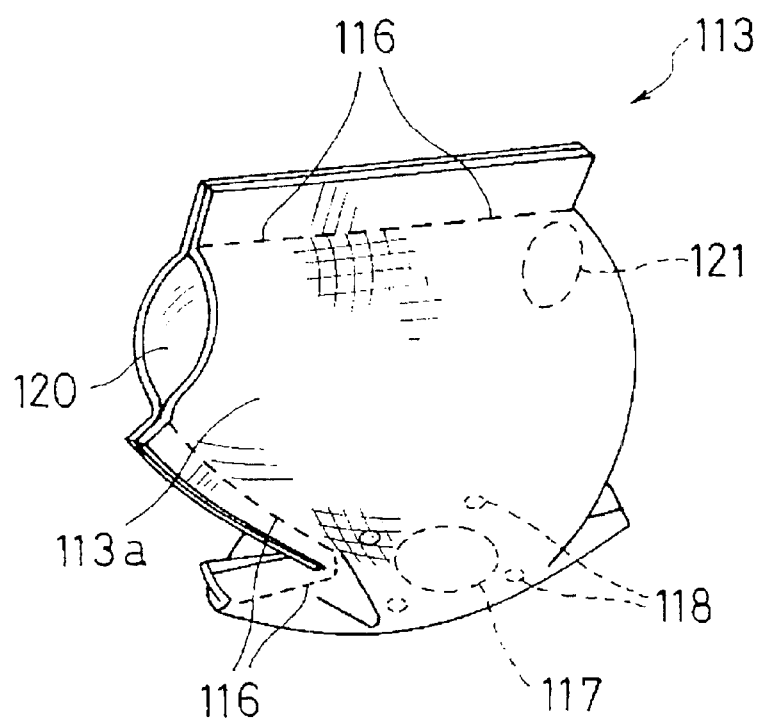
FIG. 33 is a perspective view of the inner bag, in an expanded condition, shown in FIG. 31.
Figure 34:
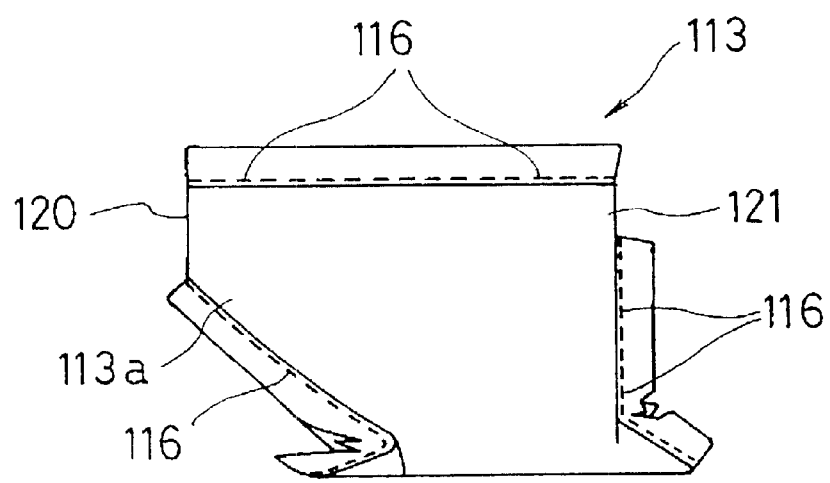
FIG. 34 is a side view of the inner bag shown in FIG. 31.

The inner bag 113 is formed of a slender panel 115 as shown in FIG. 31. The panel 115 is folded at the center thereof to pile one half side in the longitudinal direction thereof on the other half side, and circumferential edge portions of these piled portions are sewed by a sewing thread 116, bonded or welded to connect each other as shown in FIG. 32.

The panel 115 is provided with an opening 117 for an inflator (not shown) at the center thereof, and through-holes 118 around the opening 117 for allowing stud bolts (not shown) of a holding ring 123 to pass therethrough. Also, in the present embodiment, a reinforcing cloth 119 is provided at circumferential edge portions of the opening 117 and the through-holes 118.

The panel 115 is folded at the center thereof in the longitudinal direction to pile the respective side portions to thereby constitute edge portions of an upper side and a lower side of the inner bag 113. In the panel 115, one side portion for constituting a lower side edge portion of the inner bag 113 is provided with a pair of symmetrical projecting portions 115a, 115b on both sides along the side edge portion. The projecting portions 115a, 115b are piled together to thereby form the nozzle shape portion 113a. Also, in the respective side portions, predetermined areas near both end portions along the side edge portions are piled together in a non-connecting state and the other edge portions are connected together as described above. Thus, the inner bag 113 is provided with flow-out ports 120, 121 for allowing an inside of the inner bag 113 to communicate with an outside thereof at predetermined positions of the upper side and the lower side of the inner bag 113. The flow-out port 120 is formed at a forward end portion of the nozzle shape portion 113a on the lower side edge of the inner bag 113, and has a releasing quantity greater than that of the upper side flow-out port 121.

Figure 35:
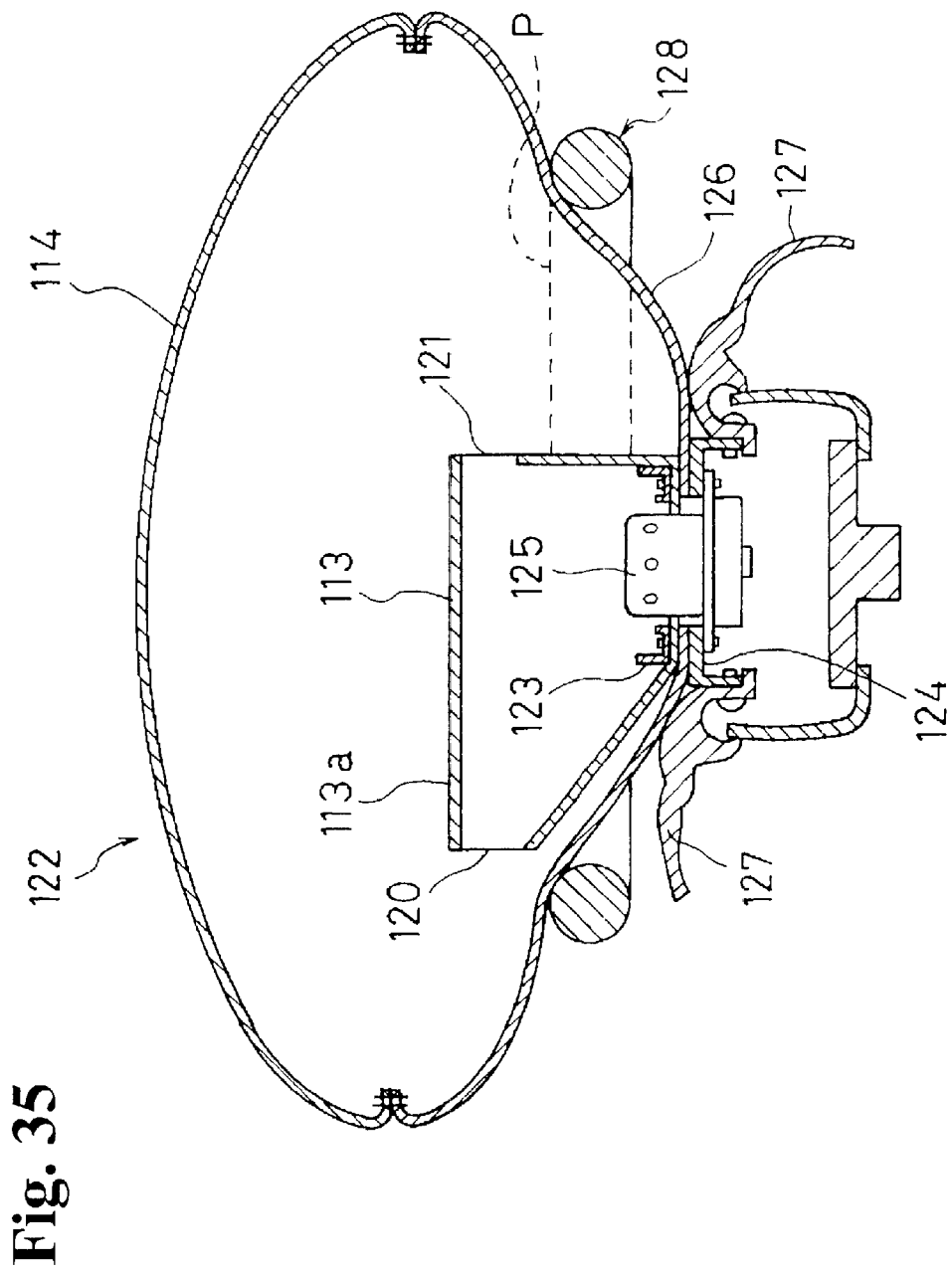
FIG. 35 is a sectional view of an air bag device having the inner bag shown in FIG. 31.

The inner bag 113 is housed in the outer bag 114 to thereby form an air bag 122 together with the outer bag 114. The inner bag 113 and outer bag 114 are connected to the retainer 124 by the holding ring 123 as shown in FIG. 35. The stud bolts (not shown) project from the holding ring 123. The stud bolts pass through the bolt holes provided in the inner bag 113 and the outer bag 114 and openings provided in the retainer 124, and nuts are screwed thereto, so that the bags 113, 114 are connected to the retainer 124. The inflater 125 is also connected to the retainer 124.

The outer bag 114 is provided with a vent hole 126 for allowing the gas in the outer bag 114 to flow out when a driver hits the expanded outer bag 114. The inner bag 113 is disposed such that the nozzle shape portion 113a extends in the lower direction toward an outer circumferential side from about center of the air bag along an inner circumferential surface of a rear end side of the outer bag 114. Thus, the lower side flow-out port 120 formed at a forward end of the nozzle shape portion 113a is positioned closer to the air bag outer circumference than the upper side flow-out port 121. Also, the flow-out ports 120, 121 are disposed on the driver's side relative to the steering wheel plane P in a state where the inner bag 113 is expanded to the largest shape.

In the air bag and the air bag device with the air bag thus structured, when a vehicle encounters an emergency situation, such as collision and rolling of the vehicle, the inflator 125 ejects a gas and the air bag 122 starts expanding.

As the air bag 122 starts expanding, a module cover 127 bursts and opens to expand the air bag 122. In this case, the gas first expands the inner bag 113 and passes through the flow-out ports 120, 121 of the inner bag to expand the outer bag 114.

After the inner bag 113 expands, since the flow-out ports 120, 121 are positioned on a driver's side relative to the steering wheel plane P, the gas discharged from the flow-out ports 120, 121 flows along the steering wheel plane P without changing its flowing direction by a steering wheel 128. Therefore, the outer bag 114 is quickly expanded in the upper and lower directions along the steering wheel plane P. After the outer bag 114 is expanded in the upper and lower directions in this manner, it expands toward the driver to become the finally expanded shape.

Incidentally, in case the outer bag 114 expands in the upper and lower directions along the steering wheel plane, as described above, since the opening area of the lower side flow-out port 120 is larger than that of the upper side flow-out port 121, a large quantity of the gas in the inner bag 113 flows out in the lower direction through the flow-out port 120. Moreover, when the inner bag 113 expands, since a forward end side of the nozzle shape portion 113a on the lower half side extends closer to the side portion of the outer bag 114 as compared to an edge portion on the upper half side of the inner bag 113, the flow-out port 120 provided at the forward end portion of the nozzle shape portion 113a is disposed on an outer circumferential side of the outer bag 114 as compared to the flow-out port 121 provided at an edge portion on the upper half portion of the inner bag 113 to thereby directly eject the gas toward the lower portion of the outer bag 114. As a result, the outer bag 114 is quickly expanded in the lower direction rather than in the upper direction, so that the outer bag 114 quickly enters a narrow space between the driver and a lower end of the steering wheel 128.

In the above embodiments, while the inner bag is connected to the retainer together with the outer bag through the holding ring, the inner bag may be connected to the outer bag by sewing with sewing threads or the like. Also, the inner bag may be made of the same cloth material as that of the general air bag, or a heat-resisting synthetic resin sheet tolerable to heat generated by the inflator.

As described above, according to the present invention, it is possible to allow the air bag to sufficiently quickly expand into a narrow space between a driver and a lower portion of a steering wheel.

While the invention has been explained with reference to the specific embodiments of the invention, the explanation is illustrative and the invention is limited only by the appended claims.

What is claimed is:

1. An air bag to be attached to a steering wheel with a steering wheel plane extending through an upper surface of the steering wheel, comprising:

an outer bag having a lower side close to a driver along a longitudinal direction of a vehicle, and an upper side opposite to the lower side, and an inner bag housed in the outer bag and having a lower gas flow-out port directed to the lower side to allow a gas ejected into the inner bag to flow out in a lower direction, and an upper gas flow-out port for allowing the gas ejected into the inner bag to flow out in an upper direction opposite to the lower direction, said lower and upper gas flow-out ports being located on a driver's side relative to the steering wheel plane in a state where the inner bag is expanded, said lower gas flow-out port having an opening area greater than that of the upper gas flow-out port to allow the gas flowing out through the lower gas flow-out port to be greater than that through the upper gas flow-out port, said inner bag being formed of two panels, each having an upper side, a lower side with a semicircular hole and two lateral sides, which are sewed together after laminating with each other to match shapes thereof such that the upper sides are completely sewed; the lower sides are sewed together except for the semicircular holes for forming a hole for an inflator; and the lateral sides are sewed together to have spaces with respect to the upper sides, one space for forming the lower gas flow-out port being greater than the other space for forming the upper gas flow-out port.

2. An air bag according to claim 1, wherein said lower gas flow-out port is disposed closer to an inner circumference of the outer bag than the upper gas flow-out port.

3. An air bag according to claim 1, wherein in the state where the inner bag is expanded, said flow-out ports are positioned closer to the steering wheel than a middle between the steering wheel plane and a farthest projected portion of the outer bag at a time of a largest expansion thereof.

4. An air bag according to claim 1, wherein said inner bag further includes auxiliary flow-out ports near the lower gas flow-out port, a total opening area of the auxiliary flow-out ports and the lower gas flow-out port being greater than an opening area of the upper gas flow-out port.

5. An air bag device comprising:

a retainer attached to the steering wheel, an inflator attached to the retainer, the air bag according to claim 1, said air bag being attached to the retainer to be expanded by a gas from the inflator, and a module cover connected to the retainer to cover the air bag.

6. An air bag according to claim 1, wherein said each panel has flanges at the lateral sides except for portions forming the spaces for the upper and lower gas flow-out portions.

7. An air bag to be attached to a steering wheel with a steering wheel plane extending through an upper surface of the steering wheel, comprising:

an outer bag having a lower side close to a driver along a longitudinal direction of a vehicle, and an upper side opposite to the lower side, and an inner bag housed in the outer bag and having a lower gas flow-out port directed to the lower side to allow a gas ejected into the inner bag to flow out in a lower direction, and an upper gas flow-out port for allowing the gas ejected into the inner bag to flow out in an upper direction opposite to the lower direction, said lower and upper gas flow-out ports being located on a driver's side relative to the steering wheel plane in a state where the inner bag is expanded, said lower gas flow-out port having an opening area greater than that of the upper gas flow-out port to allow the gas flowing out through the lower gas flow-out port to be greater than that through the upper gas flow-out port, said inner bag being formed of one panel having upper, lower and two lateral sides and an opening for an inflator at a center area thereof, which is sewed together after folding such that the upper and lower sides laminated together are completely sewed; and the lateral sides are sewed together to have spaces with respect to the upper and lower sides sewed together, one space for forming the lower gas flow-out port being greater than the other space for forming the upper gas flow-out port.

8. An air bag according to claim 7, wherein said one panel has a rectangular shape and includes two holes near the lower gas flow-out port to allow the gas to flow out near the lower gas flow-out port.

9. An air bag according to claim 7, wherein said opening is located close to one of the lateral sides where the upper gas flow-out port is formed so that the other of the lateral sides where the lower gas flow-out port is formed is located closer to an inner circumference of the outer bag than the upper gas flow-out port.

10. An air bag according to claim 9, wherein one side of the panel where the lower gas flow-out port is formed is curved from the opening to the lower gas flow-out port to smoothly introduce the gas to the lower gas flow-out port.

11. An air bag to be attached to a steering wheel with a steering wheel plane extending through an upper surface of the steering wheel, comprising:

an outer bag having a lower side close to a driver along a longitudinal direction of a vehicle, and an upper side opposite to the lower side, and an inner bag housed in the outer bag and having a lower gas flow-out port directed to the lower side to allow a gas ejected into the inner bag to flow out in a lower direction, and an upper gas flow-out port for allowing the gas ejected into the inner bag to flow out in an upper direction opposite to the lower direction, said lower and upper gas flow-out ports being located on a driver's side relative to the steering wheel plane in a state where the inner bag is expanded, said lower gas flow-out port having an opening area greater than that of the upper gas flow-out port to allow the gas flowing out through the lower gas flow-out port to be greater than that through the upper gas flow-out port, said inner bag being formed of circular upper and lower panels, said lower panel having an opening for an inflator at a center area thereof, said upper and lower panels being laminated and sewed together along peripheries thereof except for at least two portions, one portion forming the lower gas flow-out port and being greater in size than the other portion for forming the upper gas flow-out port.

12. An air bag according to claim 11, wherein said upper and lower panels are sewed together to have two additional portions near the lower gas flow-out port for allowing the gas to flow.

13. An air bag to be attached to a steering wheel with a steering wheel plane extending through an upper surface of the steering wheel, comprising:

an outer bag having a lower side close to a driver along a longitudinal direction of a vehicle, and an upper side opposite to the lower side, and an inner bag housed in the outer bag and having a lower gas flow-out port directed to the lower side to allow a gas ejected into the inner bag to flow out in a lower direction, and an upper gas flow-out port for allowing the gas ejected into the inner bag to flow out in an upper direction opposite to the lower direction, said lower and upper gas flow-out ports being located on a driver's side relative to the steering wheel plane in a state where the inner bag is expanded, said lower gas flow-out port having an opening area greater than that of the upper gas flow-out port to allow the gas flowing out through the lower gas flow-out port to be greater than that through the upper gas flow-out port, said inner bag being formed of one panel including a central portion having holes spaced apart from each other to form the upper and lower gas flow-out ports, and radial direction pieces extending outwardly from the central portion and having a plurality of through-holes, said through-holes in each radial direction piece being aligned together to form one hole and the radial direction pieces being assembled so that the radial direction pieces form an opening for an inflator.

14. An air bag according to claim 13, wherein said one panel has a cross shape, and the holes in the central portion are three, one hole forming the upper gas flow-out port and two holes forming the lower gas flow-out port.

* * * * *